US012541898B2

(12) United States Patent
Gong et al.

(10) Patent No.: US 12,541,898 B2
(45) Date of Patent: Feb. 3, 2026

(54) GENERATIVE ARTIFICIAL INTELLIGENCE VISUAL EFFECT GENERATOR

(71) Applicant: Google LLC, Mountain View, CA (US)

(72) Inventors: Haifeng Gong, Fremont, CA (US); Ruoting Wan, Sunnyvale, CA (US); Dongdong Wang, Sunnyvale, CA (US); Yicong Tian, Mountain View, CA (US); Hang Qi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 103 days.

(21) Appl. No.: 18/649,466

(22) Filed: Apr. 29, 2024

(65) Prior Publication Data

US 2025/0336122 A1   Oct. 30, 2025

(51) Int. Cl.
*G06T 11/60* (2006.01)
(52) U.S. Cl.
CPC .................. *G06T 11/60* (2013.01)

(58) Field of Classification Search
CPC ....................................................... G06T 11/60
See application file for complete search history.

(56) References Cited

U.S. PATENT DOCUMENTS

| 10,235,349 | B2 | 3/2019 | Zhang et al. |
| 10,949,978 | B2 | 3/2021 | Holzer et al. |
| 11,212,464 | B2 | 12/2021 | Knorr et al. |
| 2024/0095275 | A1* | 3/2024 | Tambi ............... G06F 16/538 |
| 2024/0338870 | A1* | 10/2024 | Iyer .................... G06T 11/60 |

* cited by examiner

*Primary Examiner* — Said Broome
*Assistant Examiner* — Andrew Shin
(74) *Attorney, Agent, or Firm* — Fish & Richardson P.C.

(57) ABSTRACT

A method and system for enhancing text with image-based visual effects is presented. An initial text prompt including a phrase for display is submitted to a language model. The language model outputs a candidate prompt. The candidate prompt may be further modified to create an image prompt. The image prompt is submitted to an image generating model which produces an image. A visual effect of the display phrase based on the image is displayed.

20 Claims, 6 Drawing Sheets

GENERATIVE ARTIFICIAL INTELLIGENCE VISUAL EFFECT GENERATOR

BACKGROUND

This specification relates to data processing and configuring artificial intelligence systems to automate visual effect generation.

Visual effects are important when displaying information. It is difficult to generate enough unique visual effects given the amount of information needing displaying.

SUMMARY

In general, one innovative aspect of the subject matter described in this specification can be embodied in methods for visually enhancing text using generative artificial intelligence.

A method of visually enhancing text includes several steps. A set of text is received by one or more processors. The set of text includes a display phrase. The one or more processors generate a candidate prompt based on the set of text, wherein the candidate prompt differs from the set of text. The one or more processors convert the candidate prompt into an image prompt by removing one or more words from the candidate prompt. The one or more processors submit the image prompt into an image generating model to generate an image. The display phrase is rendered by the one or more processors with a visual effect of the generated image.

Additional steps may include placing the display phrase in a template, adding other information from the set of text to complete the template, and using the completed template as the candidate prompt. Converting the candidate prompt into the image prompt may include submitting the candidate prompt to a large language model configured to produce an output phrase that excludes the one or more words and creating the image prompt based on the output phrase. The display phrase may be rendered as a transparent stencil over the generated image. The display phrase may be rendered as an imprint into the generated image. The display phrase may be rendered by modifying the display phrase using the generated image and also by modifying a background using the generated image.

The method may include additional steps. The method may generate a plurality of images prior to receiving the image prompt. Upon receipt of the image prompt, the image prompt may be matched with each image of the plurality of images by determining a similarity between an embedding of each of the plurality of images and an embedding of the image prompt and returning images with a similarity greater than a threshold value. The plurality of generated images with text visual effects may be ranked based on a visual appeal score.

Rendering the display phrase with a visual effect may include forming the display phrase into a mask delineated by boundaries and generating the image within the boundaries of the mask. The mask may include selecting a font for the display phrase to define the mask boundaries. The mask boundaries may be defined by a plurality of non-overlapping same-sized patches at a plurality of locations.

An artificial intelligence system may include one or more memory devices and one or more processors. The one or more processors execute code including a set of instructions. Execution of the set of instructions causes the one or more processors to perform operations including several steps. A set of text including a display phrase is received by the one or more processors. The one or more processors generate a candidate prompt based on the set of text, wherein the candidate prompt differs from the set of text. The one or more processors convert the candidate prompt into an image prompt by removing one or more words from the candidate prompt. The one or more processors submit the image prompt into an image generating model to generate an image. The display phrase is rendered by the one or more processors with a visual effect of the generated image.

Additional steps performed by the system include placing the display phrase in a template, adding other information from the set of text to complete the template, and using the completed template as the candidate prompt. Converting the candidate prompt into the image prompt includes submitting the candidate prompt to a large language model configured to produce an output phrase that excludes the one or more words and creating the image prompt based on the output phrase. The display phrase may be rendered as a transparent stencil over the generated image. The display phrase may be rendered as an imprint into the generated image. The display phrase may be rendered by modifying the display phrase using the generated image and also by modifying a background using the generated image.

The system may perform additional steps. The system may generate a plurality of images prior to receiving the image prompt. Upon receipt of the image prompt, the image prompt may be matched with each image of the plurality of images by determining a similarity between an embedding of each of the plurality of images and an embedding of the image prompt and returning images with a similarity greater than a threshold value. The plurality of generated images with text visual effects may be ranked based on a visual appeal score.

Rendering the display phrase with a visual effect may include forming the display phrase into a mask delineated by boundaries and generating the image within the boundaries of the mask. The mask may include selecting a font for the display phrase to define the mask boundaries. The mask boundaries may be defined by a plurality of non-overlapping same-sized patches at a plurality of locations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for generating visual effects from a text input. Generally speaking, the system utilizes an input text phrase to a language model, such as a large language model (LLM), that outputs a candidate prompt. The system uses the candidate prompt to create an image prompt. The image prompt is submitted to an image generating model to generate an image. Then the display phrase of the input text is rendered with a visual effect based on the image.

Given the somewhat unpredictable nature of the content that an AI system (e.g., language model) will generate, it can be difficult to automate the creation of visual effects because of the possibility that the AI system will return visual effects that are distracting or inappropriate given the phrase (or other content) to which the visual effects will be applied. As discussed herein, the predictability of the output generated by the AI system can be improved by converting prompts into a standardized image prompt and using that standardized image prompt as input to the model that generates the visual effect. The standardization of the prompts can include adding or removing text from the prompts. The standardization of the prompts can also include using a standardized format for the prompt, which will increase the likelihood that the model generates visual effects in a more predictable manner. In other words, the standardization of the prompts can be considered a way to constrain and/or configure the model to reduce the likelihood that distracting or inappropriate visual effects are generated by the model.

Figure 1:
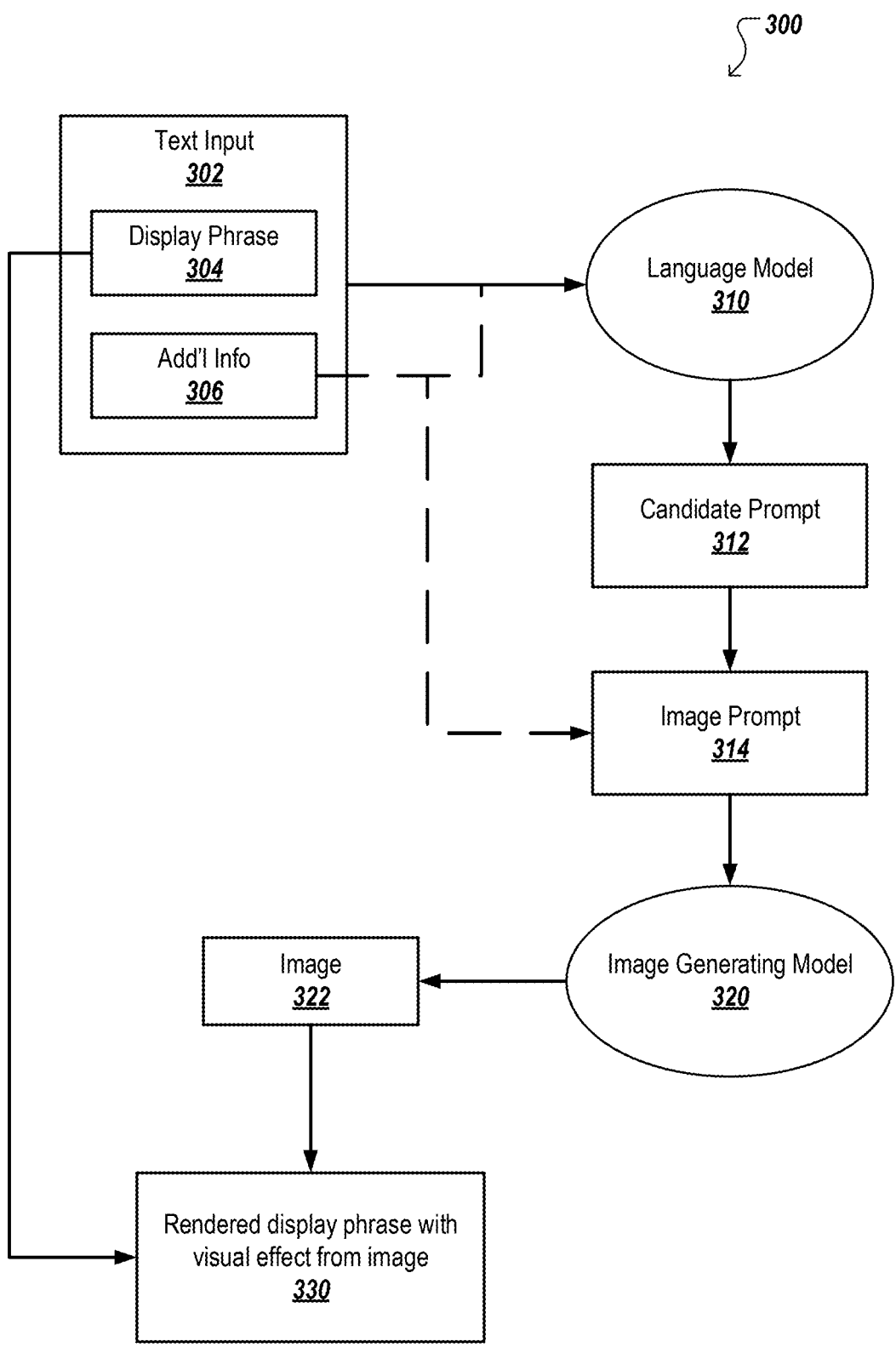
FIG. 1 is a block diagram of a process to create a visual effect works.

FIG. 1 illustrates a system for creating a visual effect for a text word or phrase, or another object. A user may submit a text input 302 to the system 300. An example may be a text phrase 302 which includes a display phrase 304 but may also include additional information 306. A display phrase 304 may be a particular phrase to which a visual effect is applied. For example, a user may input the text phrase 302 "florist, flowers in background, preferred flowers are roses, irises, daisies, and bird-of-paradise flowers," main street, anytown, display phrase='FLOWERS". In this example, the visual effect is applied to the display phrase 304 (e.g., "FLOWERS") but not to the additional information 306. The additional information 306 may be used for framing the display phrase 304 or for providing context that the AI system can use to generate the visual effect for the display phrase.

The additional information 306 may also include an address, a line of business, a target audience, or other information which may help the image generating model 320 create an appropriate image 322. The additional information 306 may also include, for example, other statements which help the language model 310 create the most useful output. Such other statements may come from experimentation with various inputs to the language model 310. These other statements may form a template into which the display phrase 304 may be placed.

An example text input in the form of a template:
Assume you are a very smart and creative UX designer.
You are asked to design a very relevant and professional text background image idea based for an advertising campaign.
For example, for a Business Service with business name "Bizname" which provides wide selection of toddler products for new parents, then we can use text background image idea: toddler clothes texture background.
Think about
Thematic/Conceptual/Futuristic/Abstract/Mathematical/Tech-Inspired Typography.
Consider using words like "background" and "texture" in the output.
Be creative and relevant.
Here are the relevant information for the display:
{"Toddler"}
Understanding of the display:
{understanding_response}
Please put your answer in JSON format, a single JSON object, which has string fields "text_effect", "rationale". Start the JSON code with "'json and end with'"

In the above example, the display phrase 304 is simply the word "Toddler" and remainder is additional information 306 and the entirety is the input text 302. The language model may be, for example, a large language model trained on a large corpus of human-understandable text which can produce a response given a text prompt. The "understanding response" section of the example template is helpful to a designer when improving the system as it provides some guidance to why a particular candidate prompt 312 was generated from the given input text 302.

An example input text 302 includes information about a jeweler and jewelry with the display phrase 304 being "Jewels." From this input text 302, the candidate prompt 312 is "diamond sparkle 3D effect." Another example input text 302 includes information about florists and flowers with a display phrase 304 being "Flowers". The candidate prompt generated is "Stylized 3D daisy blossoms". While these example candidate prompts can be used as image prompts, experiments have shown that without standardizing the image prompt, poor quality images will be generated from the image model 320.

After the language model 310 has produced the candidate prompt 312, the candidate prompt 312 may require conversion or standardization to properly constrain the image generation model 320. The standardization may include editing or formatting for the candidate prompt 312 to be converted into an appropriate image prompt 314 for submission to the image generating model 320. Such standardization may include removal of certain words or addition of certain words.

In an example, standardization may be applied to the candidate prompt 312. For instance, though the language model may provide a candidate prompt 312 including the phrase "3D effect" or "3D", experiments have demonstrated that such effects are ineffective at producing quality visual effects for text when fed into an image generating model 320. So, part of the standardization may include removal particular phrases, such as "3D effect." Another modification or standardization of the candidate prompt 312 generated by the language model 310 may be to include additional information such as additional information 306 provided in the original text input 302 or including phrases or limits on the output of the model such as modifying the candidate prompt 312 to append, for example, the phrase "texture background" to the candidate prompt 312 to create the image prompt 314. The additional information may come from other experiments and need not be included in the original text input 302. In one of the previously mentioned examples, the initial candidate prompt 312 is "diamond sparkle 3D effect" and after standardization the candidate prompt is "sparkle texture background." Another example with a candidate prompt 312 of "Stylized 3D daisy blossoms" may be standardized into "Stylized daisy texture background."

The image prompt 314 is then used as input into the image generating model 320 which generates an image 322. The image generating model 320 may be an AI generating model such as a neural network which can receive a prompt (e.g., an image prompt 314) and provide an image 322. In an example, an image generating model 320 may include a generative adversarial network, a variational autoencoder, an autoregressive model, a convolutional neural network, a large transformer model, flow-based models, diffusion models and other models for producing images from a text input.

A model may be trained prior to use as an image generating model 320. The training data may include many images with captions or labels describing the image in a text format. The training of such a model may be quite resource intensive, but the use of the image generating model 320 after it has been trained is significantly less resource intensive. The constraints on use are then the number of images requested or the number of text phrases 302 as inputs.

The output image 322 is combined with the display phrase 304 to be rendered as a visual effect 330. Examples of a display phrase 304 rendered as a visual effect 330 are provided in subsequent sections of this disclosure.

Figure 2:
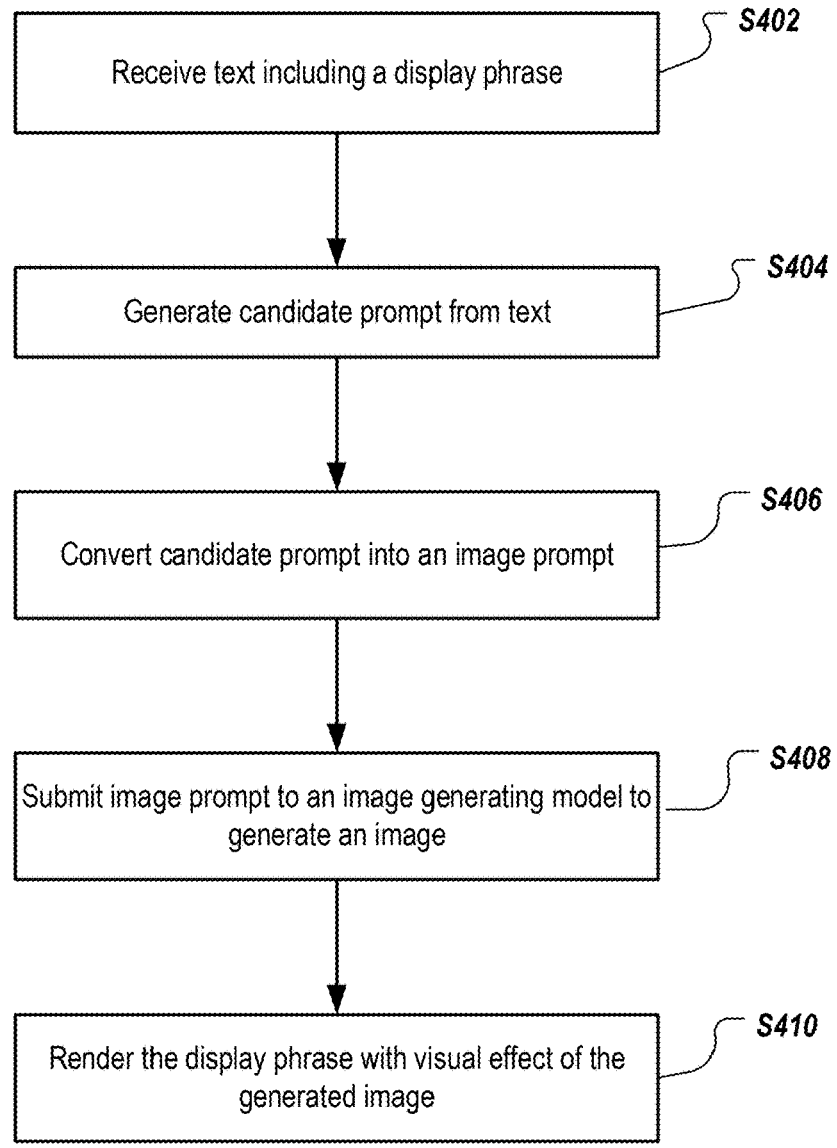
FIG. 2 is a flow chart of an example process of generative artificial intelligence to create visual effects with text.

FIG. 2 illustrates a flow chart of an example process 400 for creating a visual effect for a text or an object. A set of text including a display phrase is received (S402). The set of text can include, for example, textual assets that are available to create digital components. For example, the textual assets may have been received from a content provider as text that is approved by the content provider for inclusion in digital components generated by the system. In another example, the textual assets may be text that is extracted by the system from digital components that have been received from the content provider for distribution to users. In some situations, the textual assets may be obtained from websites or other online documents that have been published by, or on behalf of, the content provider. In a specific example, the set of text may have been extracted from a website describing the offerings (e.g., products or services) of the content provider.

In some situations, the set of text can be inserted into a template with additional information. For example, the set of text can be inserted into the template discussed above with reference to FIG. 1 to provide context for the visual effect that will be generated. When inserted into the template, the combination of information included in the template can now be considered the set of text, which can also be referred to as an augmented set of text.

Based on the augmented set of text, the language model generates a candidate prompt that differs from the set of text (S404). For example, assume that the language model uses a template similar to the one discussed above with reference to FIG. 1, along with the set of text "jewelry, watches, necklaces." In this example, the candidate prompt output by the language model may be "diamond sparkle 3D effect," which differs from the text that was input to the language model but is relevant to the set of text input to the language model.

The candidate prompt is converted into an image prompt (S406). In some implementations, the large language model converts the candidate prompt into an image prompt by excluding one or more words from the candidate prompt. For example, the candidate prompt mentioned above ("diamond sparkle 3D effect") generated by the large language model 310 may include the words "3D," "3D effect," or "three-dimensional." In this example, the text "3D effect" may be removed from the candidate prompt to produce the image prompt, which reduces the likelihood that the image generation model will generate a three-dimensional diamond instead of a pattern or other visual effect.

In some implementations, the conversion of the candidate prompt into the image prompt can also include adding words to the candidate prompt in a way that further constrains the output of the image generation model and increases the likelihood that the image generation model will generate/output a visual effect that can be applied to the display phrase. For example, the candidate prompt output by the language model in the example above did not include the words "texture background," but experiments have shown that including these words in the image prompt configures the image model to be more likely to generate a visual effect (e.g., a pattern) that is capable of being applied to the display phrase, rather than generating an image of a discrete object.

In some implementations, the conversion of the candidate prompt to the image prompt can be performed by a language model. For example, the candidate prompt can be input to the language model with a request to convert the candidate prompt into a standard form prompt (e.g., an image prompt). The request to convert the candidate prompt into the standard form prompt can include one or more examples of input prompts (e.g., candidate prompts) and their corresponding standardized outputs (e.g., image prompts). In a specific example, the request to convert the candidate prompt can be formatted as follows:

"Help me rewrite the freeform note about the text effect into standard form. The keyword "3D text with" from the input should be removed and the keyword "texture background" should be added. For example:
input text: 3D text with light effect
output text: light effect texture background
input text: 3D embossed text with grunge texture
output text: grunge texture background
input text: 3D text with glitch effect
output text: glitch effect texture background
Here is the text to convert:
Input text: diamond sparkle 3D effect."

In this example, the language model will accept the request to convert the candidate prompt, and generate an output based on the information included in that request. In this specific example, the output of the language model may be "sparkle texture background," which can be considered the image prompt. This image prompt differs from the candidate prompt in that the text "3D effect", as well as the text "diamond" (a reference to an object) has been removed, and the text "texture background" has been added.

As detailed in the example, above, the conversion of the candidate prompt into the image prompt included submission of the candidate prompt to a large language model. The large language model produces, using the candidate prompt, an output phrase that excludes one or more words of the candidate prompt. In this example, the large language model also adds one or more words that were not included in the candidate prompt and uses the output phrase of the language model to create the image prompt. In this manner, a candidate prompt generated by the large language model has been converted into an image prompt.

The image prompt is submitted to an image generating model which generates an image based on the image prompt (S408). Image generating models are models that have been trained, for example, on a large data set images each associated with a label or caption. Training such models requires large data sets and significant computer resources, but using a pre-trained generative model requires fewer computer resources. The output of the image generating model is an image generated based on the image prompt.

The display phrase is rendered with a visual effect based on the generated image (S410). For example, the visual effect can be applied to the display phrase (or another object) in a manner that cause the display phrase to have a texture, pattern, or other visual appearance of the generated image. For example, assume that the generated image is a sparkly background texture and that the display text is "JEWELS." In this example, the interior area of the text JEWELS can have the visual appearance of a sparkly background texture.

In some implementations, rendering the display phrase 304 with the visual effect may mean creating the display phrase 304 into a transparent stencil and rendering the image 322 as the background of the stencil. In some implementations, rendering the display phrase 304 may also mean using the generated image 322 as an entire background and imprinting the display phrase 304 on top of or into the generated image 322. Thus, both foreground and background visual effects may be created combining the generated image and the display phrase. Alternatively, combinations in which the image is used to create a foreground effect, for instance using the display phrase 304 itself, and also a background effect. Some examples are provided in FIGS. 3-5.

Figure 3:
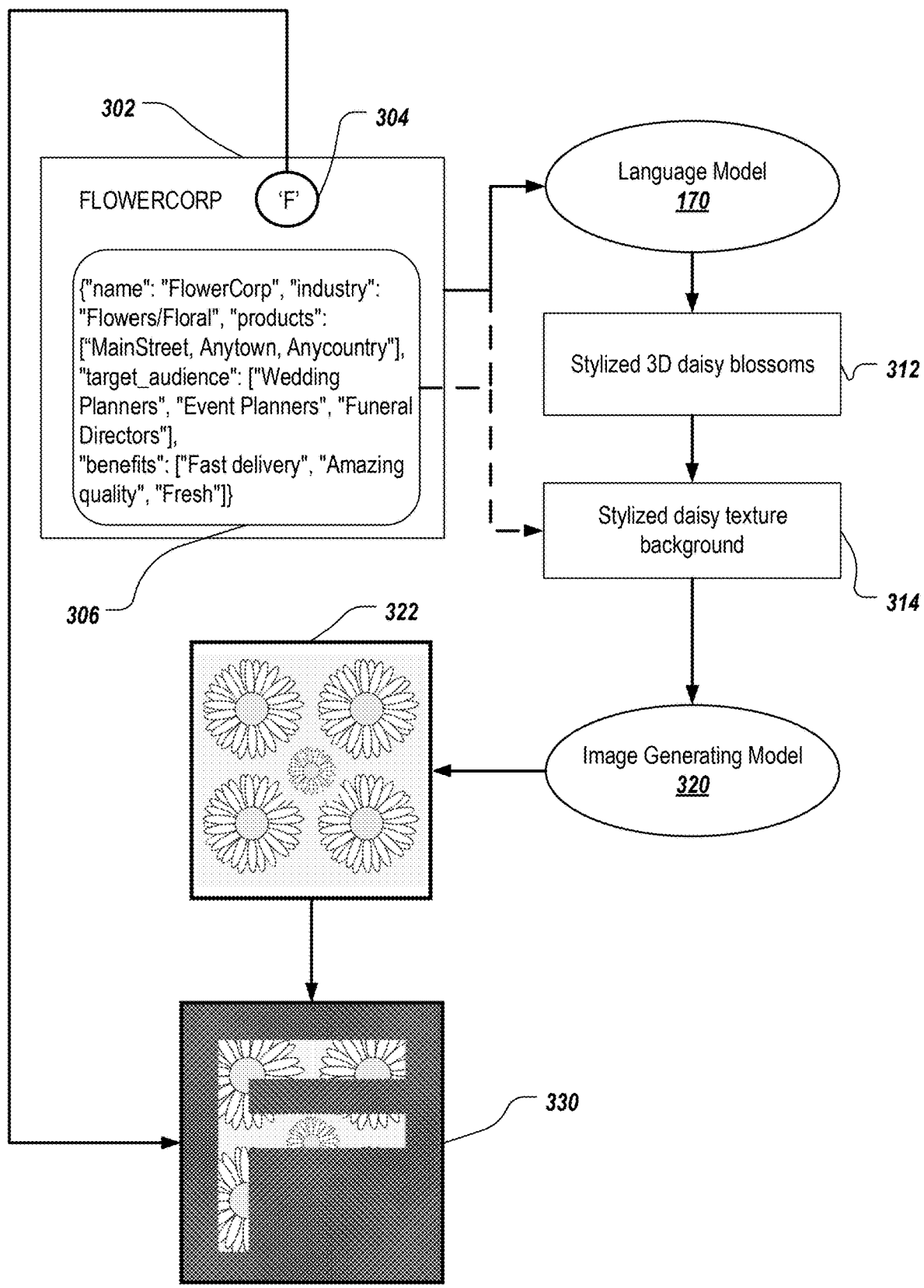
FIG. 3 illustrates an example of a text-based visual effect.

FIG. 3 illustrates an example of the process for generating the visual effect. A set of text 302 is provided which includes a display phrase 304 and additional information 306. In this example, the display phrase 304 is the capital letter "F" (circled in the figure). The additional information 306 include a company name, products the company produces, an address of the company, a target audience, benefits of this company, and could include other information as needed. The input text 302 (including the display phrase 304 and additional information 306) may be placed in a template which is fed into the language model 310 to produce the candidate prompt 312. The template may include additional phrases or background information for the language model 310. The template may also include information from the additional information 306 from the text input 302.

The candidate prompt 312 may be re-written or updated into a standardized format or it may be supplemented with additional information from the input text 302 or other sources. As explained elsewhere in this disclosure, the candidate prompt 312 may have a word or words removed from it to form the image prompt 314. The candidate prompt 312 may also have a word or words added to it to form the image prompt 314. In the example shown in FIG. 3, the candidate prompt 312 is the phrase "Stylized 3D daisy blossoms". Because experiments have shown that including "3D effect" or "3D" in the image prompt 314 provides poor quality images, those words are removed from the candidate prompt 312. Other experiments have demonstrated that including the phrase "texture background" in the image prompt 314 helps the image model 320 create more visually appealing images 322. This standardization or modification of the candidate prompt 312 may come from other experiments and need not be included in the original text input 302. In the example shown, the initial candidate prompt 312 was "Stylized 3D daisy blossoms" but after standardization it was modified to "Stylized daisy texture background" as the image prompt 314.

The image prompt 314 is submitted to the image generating model 320 to produce an image 322. In this example, the image 322 generated is a stylized set of several daisy blossoms which is used to provide a visual effect to be applied to text, e.g., as a background image. In an example, the visual effect applied to the display phrase 304 using of the generated image 322 is to use display phrase 304 as a transparent stencil through which the background image is displayed, while portions of the background image that are not within the perimeter of the display phrase 304 are occluded. Thus, the display phrase 304 (a capital letter "F") is rendered with a visual effect 330 (e.g., F as a stencil atop a stylized daisy background) based on the generated image.

Figure 4:
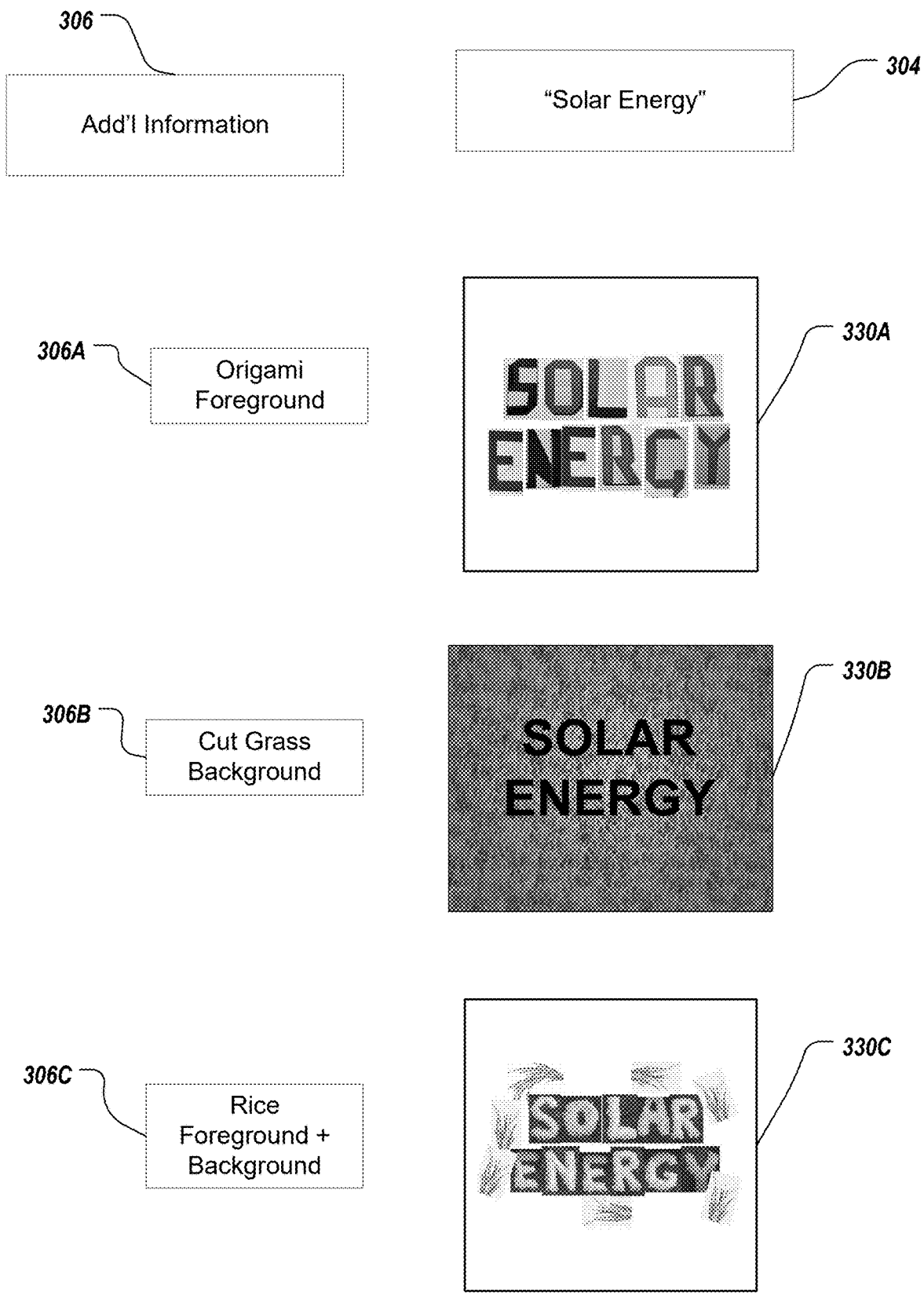
FIG. 4 illustrates examples of text-based visual effects.

FIG. 4 illustrates additional examples of visual effects. The display phrase 304 in this example is "Solar Energy" and one example each for three types of additional information 306 (foreground, background, and foreground+background) are provided as the text rendered with a visual effect 330. The additional information 306 from the initial text prompt 302 may include a phrase such as "foreground" which indicates that the visual effect should be mainly applied to the display phrase 304 itself. In the example, the additional information also includes the phrase "Origami" so that the visual effect applied to the display phrase is the letters are formed as if by origami. In the second example, the additional information 306B includes the phrases 'cut grass' and 'background.' In this second example, the display phrase 304 is relatively plain and the displayed image 330B (e.g., cut grass) provides the background upon which the display phrase 304 is rendered or displayed. Another way of thinking of using a background is that the display phrase 304 is carved into or imprinted into the background. A third example in which a visual effect is applied to both the foreground and the background is also provided 330C. In this third example, the image prompt 314 included the additional information 306C 'rice' and 'foreground and background'. So in this third example rice as a visual effect is applied to both the display phrase 304 ("Solar Energy") and also to the background.

Figure 5:
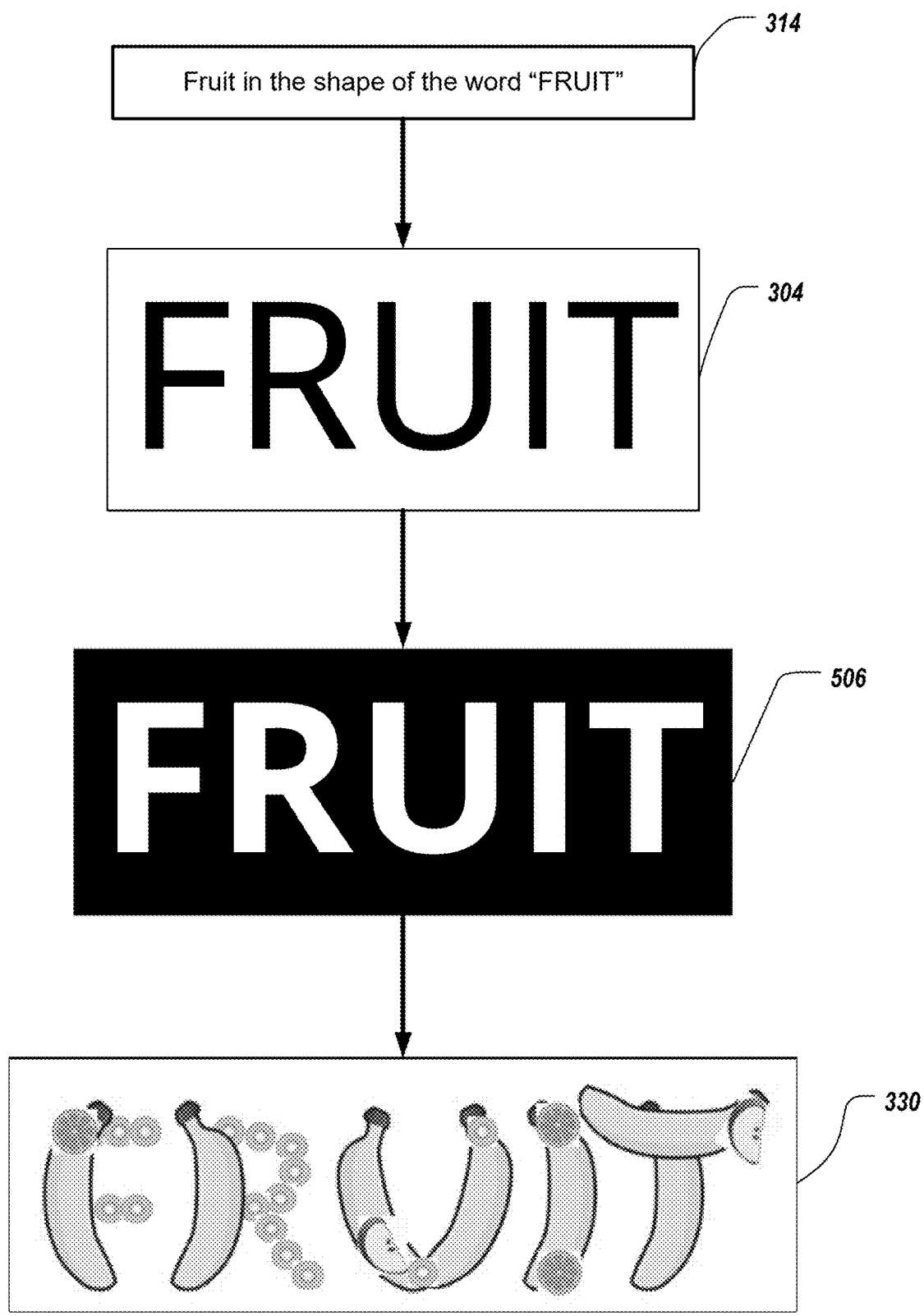
FIG. 5 illustrates an example of a text-based visual effect.

FIG. 5 illustrates a third example of forming a visual effect based on a display phrase and a generated image. In this example, part of the text input 302 is the phrase "Fruit in the shape of the word 'FRUIT'". As part of displaying this visual effect, a font is specified for displaying the display phrase. In this example, the open source font Open Sans was employed, but any other font could be chosen. A pixelated version 506 of the display phrase in the chosen font is created in order to define boundaries within which an image may be generated. An alternative way of thinking is to use the pixelated version 506 of the display phrase 304 as a mask with boundaries. The pixelated display phrase 506 uses patches of a certain pixel size to define a mask in the shape of the display phrase 304. The size of the patches may be varied as part of optimizing the generated image. For smaller patch sizes, it is possible to more closely mimic the curved portions of text characters. For larger patch sizes, it is possible to more quickly create an image which fits within the bounded region. There is a tradeoff between how quickly the text effect is created and how closely it mimics the text boundaries. In a dynamic optimization process the size of the patch can be varied over the entirety of the display phrase being, for example, smaller on curved portions of text characters and larger on straight portions of text characters, albeit at an increased cost in computational resources. Another example would include a display phrase 304 with different words in different font sizes. The larger font words could have large patch sizes and the smaller font words could have smaller patch sizes.

In the example shown in the figure, after the boundaries have been determined, an image or images are generated by the image generating model 320 subject to the constraint that they must fit within the boundaries of the pixelated version 506 of the display phrase 304. In this example the visual effect 330 shows up as if each letter of the word "FRUIT" were written with various pieces of fruit. The size of each of the patches may be defined as a square of a set a number of pixels (e.g., 3×3 pixels, 5×5 pixels) which may also depend on the device being used to display visual effect. In another embodiment, the patches may be defined as rectangles (e.g., 3×5 pixels, or 3×7 pixels). In other embodiments, the patches may be defined as other shapes or other sizes (e.g., hexagons and each hexagon edge is 7 pixels). In another embodiment, the patch size may vary depending on the location in the display phrase 304. For example, in the "F" of the "FRUIT" in the Open Sans font, a square patch as large as the width of the arm of the "F" in pixels can be used without loss of fidelity. In the "R" of "FRUIT" the curved section may have a smaller optimal size of the patch compared with a letter with only straight segments. So, in an example, the "T" may use square patches of size 7×7 pixels and the "R" may use patches of 3×3 pixels. Similarly, the "T" may use a first rectangle of size 5×40 pixels and two second rectangles of size 10×5 pixels, the "T" may use a single rectangle of size 5×40 pixels, and the "R" may use square patches of size 2×2 pixels to define the mask and the boundaries of the mask.

In some implementations, including any of the implementations discussed above, the image generator 320 may produce many images. These images are pre-generated in that they are generated before receipt of a particular text input 302, a particular candidate prompt 312, and a particular image prompt 314. An embedding of each of the images may also be determined prior to receiving the current image prompt 314. When the image prompt 314 is received, an embedding of the image prompt 314 is determined and a similarity is calculated between the embedding of the image prompt and the embedding of each of the pre-generated images. All of the pre-generated images which have a similarity greater than a threshold value may be returned as an image 322 for use with the visual effect. Alternatively, a specified number of pre-generated images, ranked by their similarity values with the image prompt 314, may be returned as an image 322 for use with the visual effect. By generating the images and their embeddings in advance, it will be possible to save resources by only calling upon the image generating model 320 once to produce a group of images and then using the similarity comparison with the embedding of the image prompt 314 to select fewer than all the images. In this instance one measure of the quality of the image 322 is the similarity calculated between the embedding of the image 322 and the embedding of the image prompt 314. The image generating model 320 thus would not need to be used constantly but could be used at times of cheaper energy or when the computing resources are otherwise less constrained. For example, all the images could be ranked by similarity of their embedding with the embedding of the image prompt 314 and the top 10 (or the top 200 or, more generally the top N) images would be provided. In another implementation, the image generating model can rank the pre-generated images by a visual appeal score.

Figure 6:
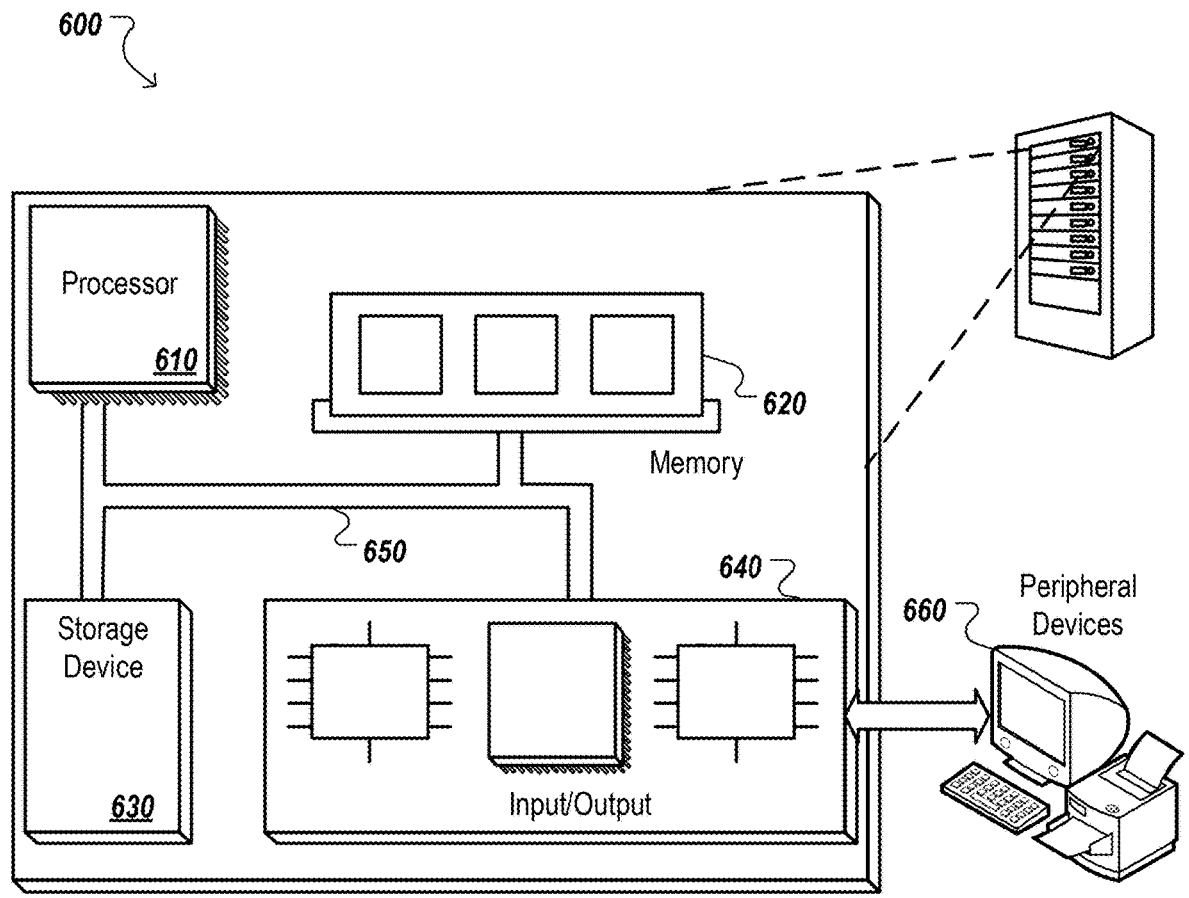
FIG. 6 is a block diagram of an example electronic device.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of visually enhancing text comprising:
   receiving, by one or more processors, a set of text including a display phrase;
   generating, by the one or more processors, a candidate prompt based on the set of text, wherein the candidate prompt differs from the set of text;
   converting, by the one or more processors, the candidate prompt into an image prompt by removing one or more words from the candidate prompt;
   submitting the image prompt into an image generating model to generate an image; and
   rendering the display phrase with a visual effect of the generated image.

2. The method of claim 1, further comprising:
   placing the display phrase in a template;
   adding other information from the set of text to complete the template; and
   using the completed template as the candidate prompt.

3. The method of claim 1, wherein converting the candidate prompt into the image prompt comprises:
   submitting the candidate prompt to a large language model configured to produce, using the candidate prompt, an output phrase that excludes the one or more words; and
   creating the image prompt based on the output phrase.

4. The method of claim 1, wherein rendering the display phrase with a visual effect comprises rendering the display phrase as a transparent stencil over the generated image.

5. The method of claim 1, wherein rendering the display phrase with a visual effect comprises imprinting the display phrase into the generated image.

6. The method of claim 1, wherein rendering the display phrase with a visual effect comprises both modifying the display phrase and modifying a background using the generated image.

7. The method of claim 1, further comprising:
   generating a plurality of images prior to receiving the image prompt;
   upon receipt of the image prompt, matching the image prompt with an image of the plurality of images by determining a similarity between an embedding of each of the plurality of images and an embedding of the image prompt, and returning images with a similarity greater than a threshold value.

8. The method of claim 7, wherein the plurality of generated images with text visual effects are ranked based on a visual appeal score.

9. The method of claim 1, wherein rendering the display phrase with a visual effect comprises:
   forming the display phrase into a mask delineated by boundaries; and
   generating the image within the boundaries of the mask.

10. The method of claim 9, further comprising selecting a font for the display phrase, wherein the mask boundaries are defined by a plurality of non-overlapping same-sized patches at a plurality of locations.

11. An artificial intelligence system comprising:
    one or more memory devices; and
    one or more processors configured to execute code including a set of instructions, wherein execution of the set of instructions causes the one or more processors to perform operations comprising:
    receiving, by the one or more processors, a set of text including a display phrase;
    generating, by the one or more processors, a candidate prompt based on the set of text, wherein the candidate prompt differs from the set of text;
    converting, by the one or more processors, the candidate prompt into an image prompt by removing one or more words from the candidate prompt;
    submitting the image prompt into an image generating model to generate an image; and
    rendering the display phrase with a visual effect of the generated image.

12. The system of claim 11, wherein the one or more processors further perform operations comprising:
    placing the display phrase in a template;
    adding other information from the set of text to complete the template; and
    using the completed template as the candidate prompt.

13. The system of claim 11, wherein converting the candidate prompt into the image prompt comprises:
    submitting the candidate prompt to a large language model configured to produce, using the candidate prompt, an output phrase that excludes the one or more words; and
    creating the image prompt based on the output phrase.

14. The system of claim 11, wherein rendering the display phrase with a visual effect comprises rendering the display phrase as a transparent stencil over the generated image.

15. The system of claim 11, wherein rendering the display phrase with a visual effect comprises imprinting the display phrase into the generated image.

16. The system of claim 11, wherein rendering the display phrase with a visual effect comprises both modifying the display phrase and modifying a background using the generated image.

17. The system of claim 11, wherein the one or more processors further perform operations comprising:
   generating a plurality of images prior to receiving the image prompt;
   upon receipt of the image prompt, matching the image prompt with an image of the plurality of images by determining a similarity between an embedding of each of the plurality of images and an embedding of the image prompt, and returning images with a similarity greater than a threshold value.

18. The system of claim 17, wherein the plurality of generated images with text visual effects are ranked based on a visual appeal score.

19. The system of claim 11, wherein rendering the display phrase with a visual effect comprises:
   forming the display phrase into a mask delineated by boundaries; and
   generating the image within the boundaries of the mask.

20. The system of claim 19, wherein the one or more processors further perform operations comprising selecting a font for the display phrase, wherein the mask boundaries are defined by a plurality of non-overlapping same-sized patches at a plurality of locations.

* * * * *